United States Patent [19]
Ullrich

[11] Patent Number: 5,111,422
[45] Date of Patent: May 5, 1992

[54] CIRCUIT ARRANGEMENT FOR CALCULATING PRODUCT SUMS

[75] Inventor: Manfred F. Ullrich, Denzlingen, Fed. Rep. of Germany

[73] Assignee: Deutsche ITT Industries GmbH, Freiburg, Fed. Rep. of Germany

[21] Appl. No.: 577,394

[22] Filed: Sep. 4, 1990

[30] Foreign Application Priority Data

Sep. 20, 1989 [EP] European Pat. Off. .......... 89 117362

[51] Int. Cl.$^5$ ............................. G06F 7/00; G06F 7/52
[52] U.S. Cl. .................................. 364/750.5; 364/754
[58] Field of Search ....................... 364/754, 750.5, 757

[56] References Cited

U.S. PATENT DOCUMENTS

| 4,573,136 | 2/1986 | Rossiter | 364/757 X |
| 4,679,164 | 7/1987 | Renrich | 364/728.01 |

FOREIGN PATENT DOCUMENTS 0260618  9/1987 European Pat. Off. .
2563349  4/1984 France .

OTHER PUBLICATIONS

IEE Proceedings-G/Electronic Circuits & Systems, Book 134, No. 5, Teil G., Oct., 1987, pp. 216-224, "Efficient Bit-Level Systolic Array for the Linear Discriminant Function Classifier".
Proceedings of the 7th Symposium on Computer Arithmetic, Jun, 1985 IEEE, New York, U.S.; S. P. Smith, et al., "Design of a fast Inner Product Processor" IEEE Trans. on Computers, Book C-29, No. 10, Oct., 1980, pp. 946-950, E. E. Swartzlander, Jr: Merged Arthmetic.

Primary Examiner—Tan V. Mai
Attorney, Agent, or Firm—Thomas L. Peterson

[57] ABSTRACT

By using a basic cell (g), an overall array (ga) for forming n products from pairs of multidigit binary numbers Amn, Bkn and for adding these n products is formed, with the formation and summation of all partial products being interleaved row by row. Each basic cell contains a delay unit for the A-coefficient inputs controlled by a half clock signal, an undelayed through connection for the B-coefficient input, an added fed via respective delay units with a sum input, a carry input, and a summation input, and a logic gate which combines the B-coefficient with the undelayed A-coefficients to form the partial product thereof and provides the partial product to the summation input of the adder.

6 Claims, 4 Drawing Sheets

CIRCUIT ARRANGEMENT FOR CALCULATING PRODUCT SUMS

FIELD OF THE INVENTION

The present invention relates to a circuit arrangement for calculating product sums, and particularly, to the type in which the product of two multidigit binary numbers is obtained on the pipeline principle using n parallel multipliers and adder/shift register arrays.

DESCRIPTION OF RELATED PRIOR ART

During the processing of digital signals derived from continuous analog signals, e.g., a video signal, it is frequently necessary to form products of two multidigit binary numbers and to add up these products. One application of this product summation is, for example, the implementation of a digital RGB matrix in color-television receivers containing digital signal processing circuitry. By choosing different coefficients for this matrix, the color rendition can be changed, e.g., as a function of picture brightness. In another application, the color-rendering properties of the picture tube are stored as matrix coefficients, so that each picture tube can be driven on an individual basis. The necessary arithmetic operations for video-signal processing must be performed at a high speed. In mathematical representation, one of the problems to be solved is as follows:

$$\begin{pmatrix} A1 \\ A2 \\ A3 \end{pmatrix} \times \begin{pmatrix} B11 & B12 & B13 \\ B21 & B22 & B23 \\ B31 & B32 & B33 \end{pmatrix} + \begin{pmatrix} D1 \\ D2 \\ D3 \end{pmatrix} = \begin{pmatrix} P1 \\ P2 \\ P3 \end{pmatrix}$$

The three binary numbers A1, A2, A3 represent the Y, I, Q signals, which after matrixing process form the three R, G, B color signals with which the picture-tube cathodes are driven The three binary numbers D1, D2, D3 are added to the three color signals as adaptive values The matrix proper is formed by the nine matrix elements B11, B33 in parentheses In video applications, the range of numbers should be limited to values between $+1$ and $-1$.

For video applications, the individual binary numbers are present in two's complement form, the A-binary numbers comprising nine digits, the P-binary numbers eleven digits, the B-binary numbers of the matrix elements nine digits, and the D-binary numbers eleven digits, for example.

The following three calculations must be performed in parallel:

$$A1B11 + A2B12 + A3B13 + D1 = P1$$

$$A1B21 + A2B22 + A3B23 + D2 = P2$$

$$A1B31 + A2B32 + A3B33 + D3 = P3$$

From this it follows that a calculating circuit can consist of three identical arithmetic units each of which performs one of the three product-sum calculations. Multiplication of binary numbers is commonly performed by multiplying each digit of one binary number by each digit of the other binary number and adding the partial products arranged side by side and one below the other column by column. Any carry is added in the next higher-order bit position. The partial products extend from a least significant bit ($=$LSB) up to a most significant bit ($=$MSB). Each partial product has the binary value "one" or "zero."

If, for example, a three-digit binary number Am is multiplied by a four-digit binary number Bk, one obtains the known arrangement of partial products shown in FIG. 1, which must be added column by column. A superscript bar above a partial product indicates that the value of the partial product must be inverted because of the two's complement representation. The result of this multiplication is the seven-digit binary number P.

Because of the two's complement representation, those partial products which include exactly one most significant bit of the A- or B-binary number must enter into the addition as inverted quantities, and a "one" must be added in three bit positions in the multiplication scheme, namely in the mth, kth and (m+k)th positions. The (m+k+1)st position is only of importance for overflow recognition. The partial product in the MSB position is not inverted, since as a result of the two most significant coefficients, it was inverted twice, so to speak.

If m=k, two "one's" are added in the mth position, or a single "one" is added in the (m+1)st position, which is equivalent.

For a complete calculation of the above matrix, three such multiplications with different binary numbers must be performed for a single matrix row, and their results must be added, with the D-binary number finally being added to the total. FIG. 2 shows a block diagram of a conventional calculating circuit for this purpose, containing multipliers and adders. For product summations, however, this processing mode has a few fundamental disadvantages:

1. The A3-binary number must be delayed with respect to the two other A-binary numbers A1, A2.

2. The use of pipelining for parallel multipliers makes it necessary to straighten the wavefront at several points.

3. Finally, problems arise in connection with the routing of lines since the data lines are very wide because of the high numbers of bits. Furthermore, function blocks of different size are required which are difficult to adapt to one another, thus increasing the amount of area required by the monolithic integrated circuit.

SUMMARY OF THE INVENTION

Accordingly, the object of the invention as claimed is to implement the product summation of, e.g., a matrix row in a single compact circuit block employing parallel processing, with the turnaround time being as short as possible.

In accordance with the invention, a circuit arrangement for forming n products from two multidigit binary numbers Amn, Bkn and for adding said n products, where n is a positive integer greater than one, comprises:

an overall array of n parallel multipliers, each comprising a basic array of individual partial product rows formed by respective basic cells;

wherein the individual partial product rows of the n basic arrays are interleaved row by row so that the corresponding partial product rows of all n basic arrays are arranged one below the other in respective row groups of n partial product rows each, and wherein the successive partial product rows of all of the successive row groups are interconnected in a pipeline configuration in which each basic cell of a partial product row has an input end connected to adjacent basic cells of the partial product row located thereabove, including an addend input, a carry input, and n A-coefficient inputs, a B-coefficient input connected to a preceeding adjacent basic cell of the same partial product row, an output end connected to adjacent basic cells of the partial product row located therebelow, including an addend output, a carry output, and n A-coefficient outputs, and a B-coefficient output connected to a succeeding adjacent basic cell of the same partial product row, and wherein each basic cell contains: a delay unit for each of n A-coefficients which are applied to the A-coefficient inputs, said delay units being controlled by a half clock signal; an undelayed through connection for a B-coefficient which is applied to the B-coefficient input; an adder fed via respective delay units with the sum signal applied to the sum input, the carry signal applied to the carry input, and a summation input; and a logic gate which combines the B-coefficient with the undelayed A-coefficients to form the partial product thereof and provides said partial product to the summation input of said adder.

BRIEF DESCRIPTION OF DRAWINGS

The invention will now be explained in greater detail with reference to the accompanying drawings, in which.

DETAILED DESCRIPTION OF PREFERRED EMBODIMENTS

Figure 1:
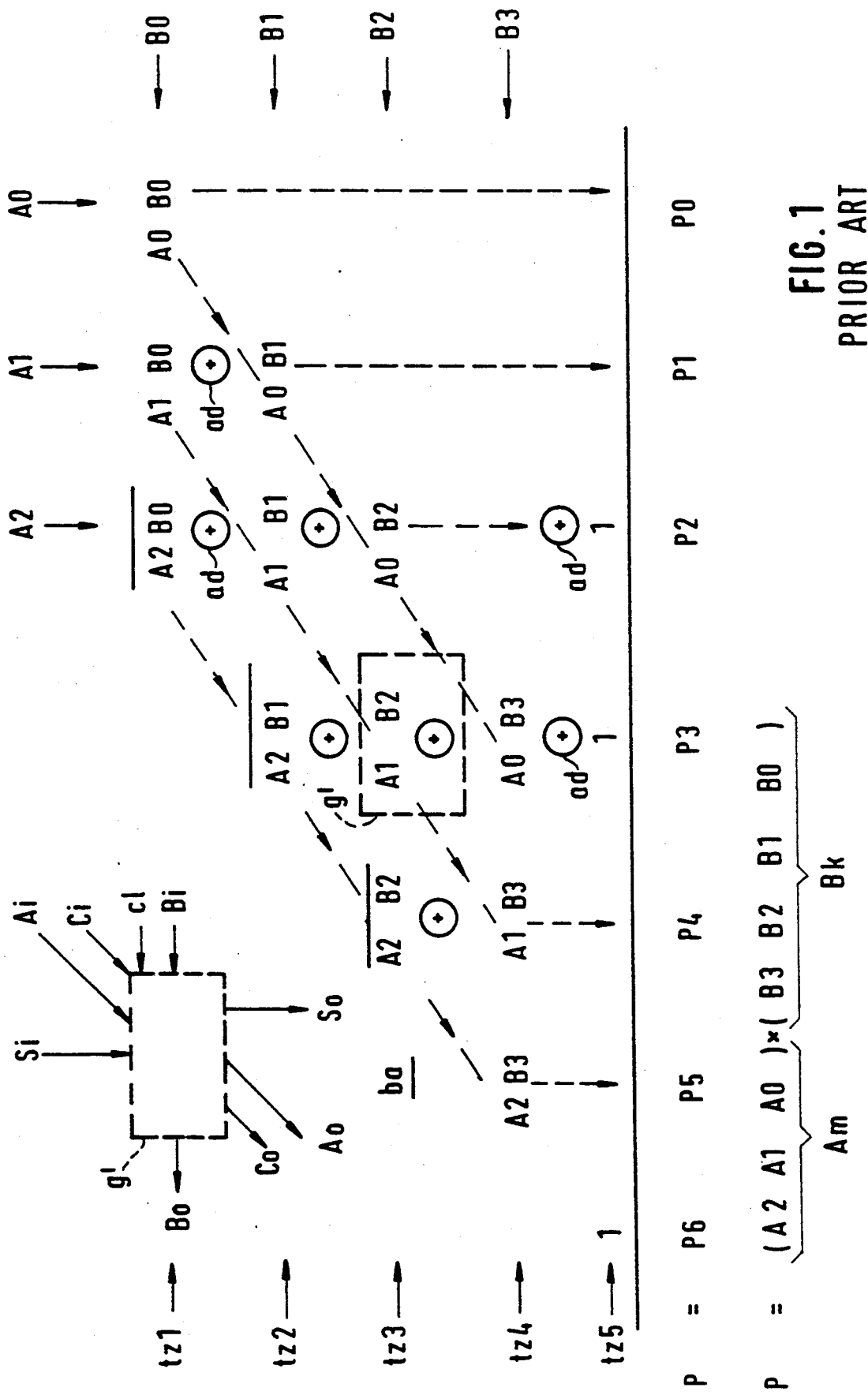
FIG. 1 shows the multiplication scheme for two multidigit binary numbers and the resulting basic array of a prior art parallel multiplier.

From the multiplication scheme for two multidigit binary numbers $A_m$, $B_k$ in FIG. 1, it can be seen that in each partial row, each coefficient of the A-binary number is multiplied by one coefficient of the B-binary number. In the next partial row, all coefficients of the A-binary number are shifted one position to the left, and each A-coefficient of this partial row is multiplied by the next B-coefficient. This left shift and multiplication continues until the most significant coefficient B3 of the B-binary number has been multiplied by all coefficients of the A-binary number in the last partial row. In two's complement representation, "ones" are added in different positions in a further partial row, as mentioned above. The product of the sums of all partial rows is the multi-digit P-binary number P.

The arrangement of FIG. 1 leads to the basic array ba, which permits parallel multiplication. The calculating process advances by one partial row tz on each clock pulse. The basic array ba is constructed from basic cells g' which are fed from the upper partial row with a sum signal $S_i$, a carry signal $C_i$, and a coefficient $A_i$ of the A-binary number. Furthermore, all basic cells g' of a partial row are fed horizontally with a coefficient $B_i$ of the B-binary number. The basic cell contains a multiplier unit for multiplying the two coefficients of the A and B-binary numbers, and an adder unit in which the applied sum signal $S_i$, the carry signal $C_i$, and the internally computed multiplication result are added and delayed by one clock period. The new sum signal $S_o$ is passed to the basic cell located directly therebelow, and the original A-coefficient $A_o$, delayed by one clock period, and the new carry signal $C_o$ are passed to the adjacent cell to the left of this basic cell.

Figure 2:
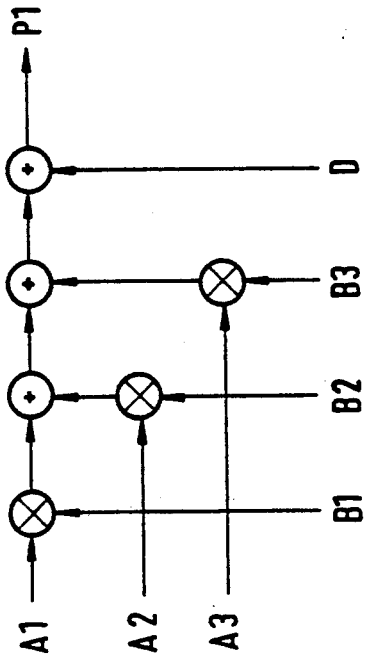
FIG. 2 is a block diagram of a conventional circuit arrangement for calculating product sums.

FIG. 2 shows schematically how a row in the above matrix is commonly calculated. Three multipliers first form the individual products, which are then added successively by three two-input adders, the last adder adding the D-binary number to the output of the preceding adder. The output signal is the product sum Pl.

The fundamental idea of the invention is to interleave the entire calculating process rather than perform the individual multiplications and additions independently of each other. For the final result, it is of no consequence in what order the additions of the individual partial products of all parallel multipliers are performed. Only two conditions must be fulfilled: first, only bits of equal significance—i.e., only in the column direction—may be added; and second, the addends must belong together in time, i.e., they must originate from a single partial row tz.

Figure 3:
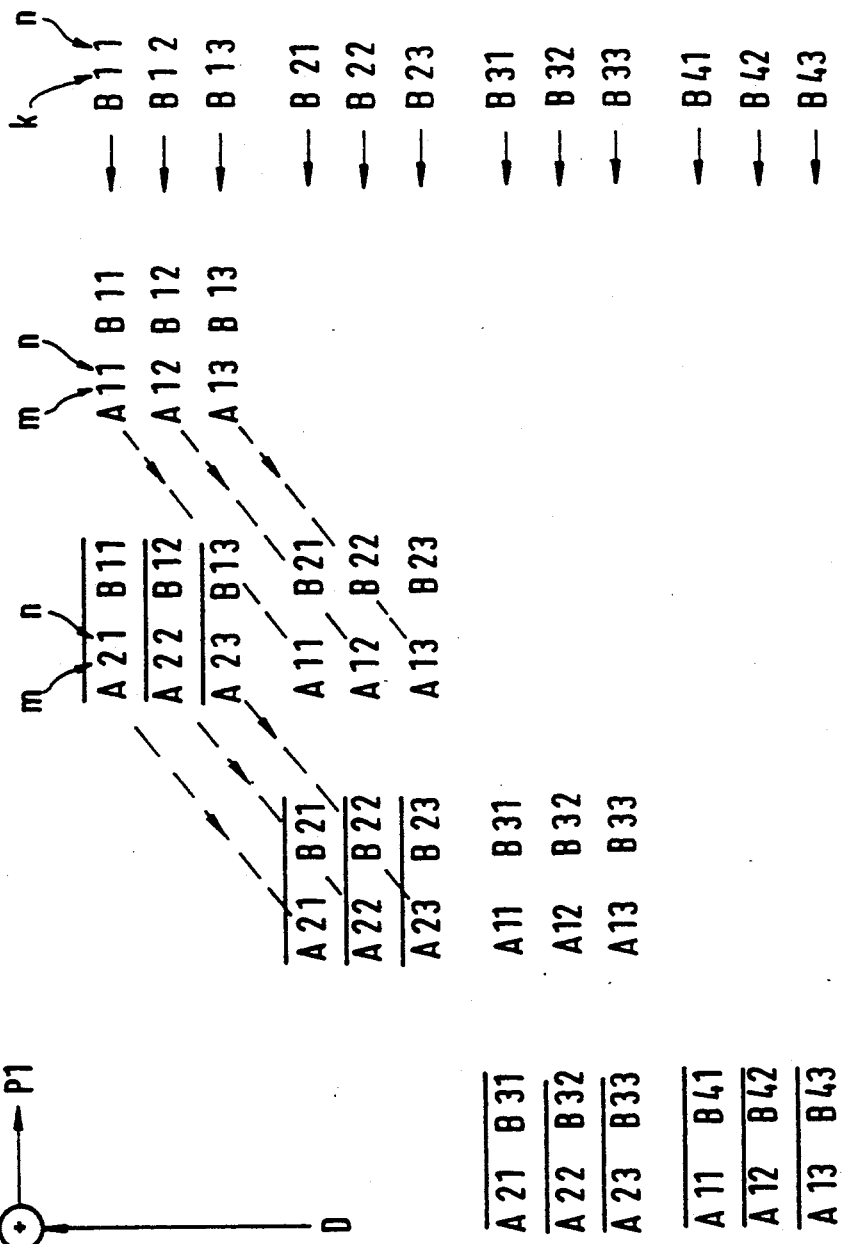
FIG. 3 shows a multiplication scheme according to the invention for calculating three product sums in parallel.

In FIG. 3, the scheme of this product summation is readily apparent from the multiplication scheme shown. The product sum Ps is formed from three binary-number products, with the A-binary numbers $Am1$, $Am2$, $Am3$ comprising two digits, and the B-binary numbers $Bk1$, $Bk2$, $Bk3$ four digits. In the first partial row, all coefficients of the first A-binary number $Am1$ are multiplied by the least significant coefficient $B11$ of the first B-binary number $Bk1$. In the next partial row, all coefficients of the second A-binary number $Am2$ are multiplied by the least significant coefficient $B12$ of the second B-binary number $Bk2$. In the third partial row, the corresponding partial products of the third A-binary number $Am3$ and the least significant coefficient $B13$ of the third B-binary number $Bk2$ are formed. Every three partial products formed from equally significant coefficients of the A- and B- binary numbers are arranged one below the other.

The first three partial rows thus form a first row group whose equally significant partial products are arranged directly one below the other. The subsequent, second row group is shifted one position to the left. The individual products of this second row group, too, are arranged one below the other in accordance with their positional weights. In FIG. 3, it is indicated by dashed lines how the coefficients of the three A-binary numbers are shifted in parallel to the lower left from row group to row group. The right-hand column gives the associated B-coefficients of the three B-binary numbers. To determine the significances of the individual bits of the required product sum Ps, and thus the individual coefficients $Ps0$, $Ps1$, ..., etc., it is now only necessary to add all partial products of a column, taking account of the overflow. Inversion of the individual partial products and addition of a few "ones" in the last partial row are required by the above-mentioned rules of two's complement representation.

From the schematic representation of FIG. 3, a basic cell g similar to the basic cell g' of FIG. 1 can be derived with which an overall array ga can be built to implement a circuit for forming product sums in accordance with the scheme of FIG. 3.

Figure 4:
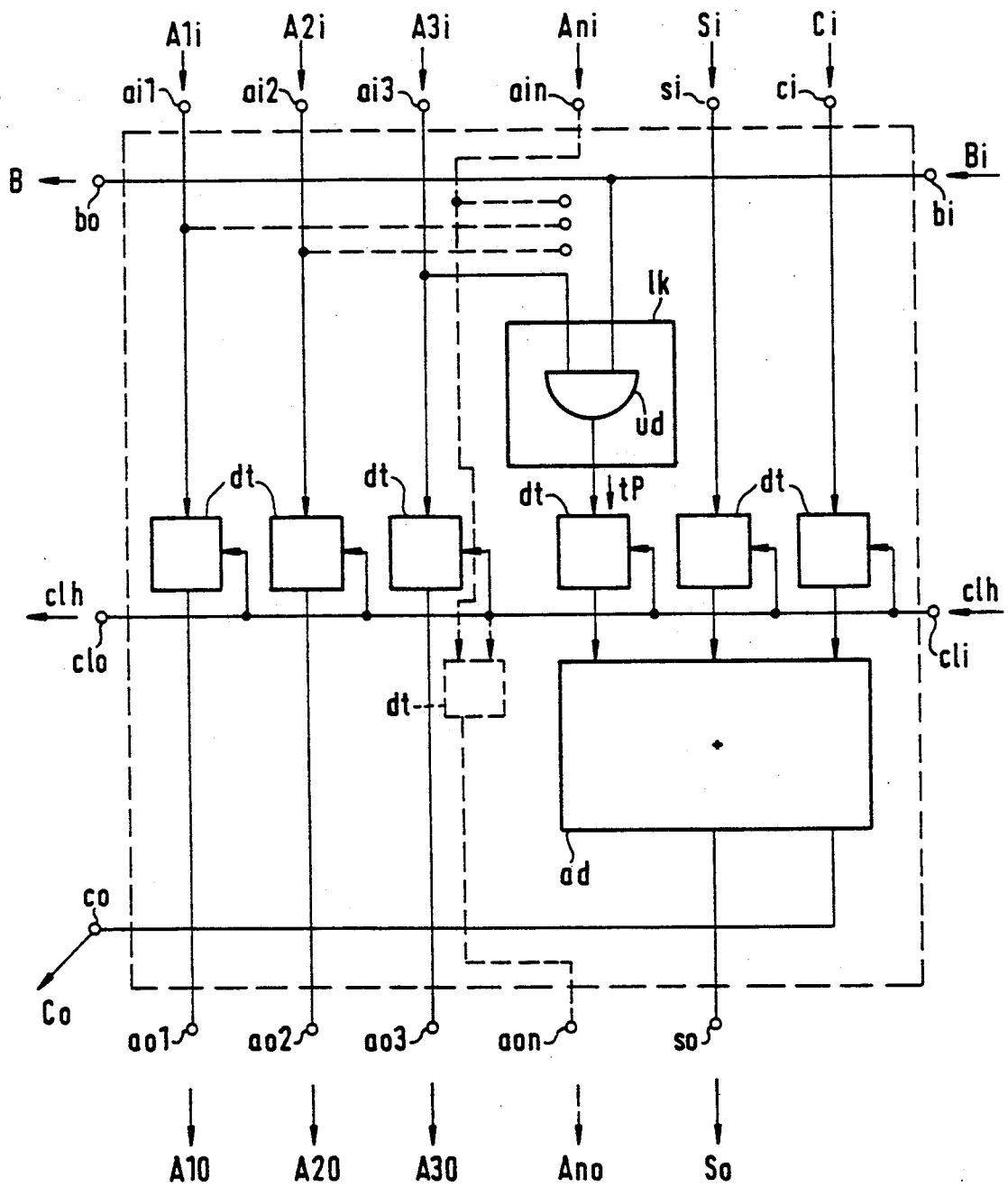
FIG. 4 is a block diagram of a basic cell for the overall array of FIG. 5.

FIG. 4 shows this basic cell g in a block diagram. From the adjacent basic cells g of the upper partial row, all n equally significant coefficients of the n A-binary numbers are fed to the basic cell g. In the example shown, where n=3 (the sum of three products is to be determined), these are the three coefficients A1i, A2i, A3i. From adjacent basic cells in the partial row located thereabove, a sum signal Si and a carry signal Ci are fed to the basic cell through a sum input si originating from the directly opposite basic cell. The three A-coefficient inputs are fed to the basic cell g through the three A-coefficient inputs ai1, ai2, ai3. The A-coefficient inputs of the first partial row of a row group zg are fed from the adjacent basic cell at the upper right. The remaining partial rows of this row group are connected in the vertical direction to the A-coefficient outputs of the basic cells in the respective preceding partial row. In the basic cell, each of the A-coefficients is delayed by means of a delay circuit dt and transferred to an A-coefficient output a01, a02, a03, which passes the delayed A-coefficients A1o, A2o, A3o to the adjacent basic cell g in the next partial row. The delay is equal to half a clock period and is controlled by a half clock signal clh, to which all delay circuits dt are connected. Via a through connection having an input cli and an output clo, all basic cells g of a partial row are synchronized.

As all basic cells g of a partial row are fed with the same B-coefficient Bi, the latter is connected via an undelayed through connection to all basic cells of this partial row. The basic cell thus has an input bi and an output bo. Connected to this through line is one input of a logic gate lk whose other input is fed with one of the n undelayed A-coefficients. In FIG. 4, this is the A-coefficient A3i of the third A-binary number.

An additional A-coefficient through connection via the A-coefficient input ain and output aon is indicated in FIG. 4 by a dashed line. It serves to illustrate the more general case where the product sum is formed from more than three products. In that case, n products must be formed from two m- and k-digit binary numbers Amn, Bkn, which may all be different from each other. The basic cell g must thus be fed with n A-coefficients A1i, A2i, ..., Ani. After a delay equal to half a clock period, their values are transferred unchanged as delayed A-coefficients A1o, A2o, ..., Ano to the basic cell of the next partial row. In each row, the logic gate lk must be fed with one of these undelayed A-coefficients Ai1, ..., Ani.

The products are formed by means of the logic gate lk, an AND gate ud in the embodiment shown or a NAND gate if the partial product tp must be inverted. This partial product passes through an additional delay circuit dt, which is controlled by the half clock signal clh, and is applied to a summation input of a full adder ad whose two other summation inputs receive the sum signal Si and the carry signal Ci, respectively, from the preceding partial row via a delay circuit dt controlled by the half clock signal clh. The output signals of the full adder ad are the sum signal So and the carry signal Co, the sum signal So being usually applied to the basic cell located directly below the full adder ad, and the carry signal Co being transferred to the basic cell located at the lower left.

Figure 5:
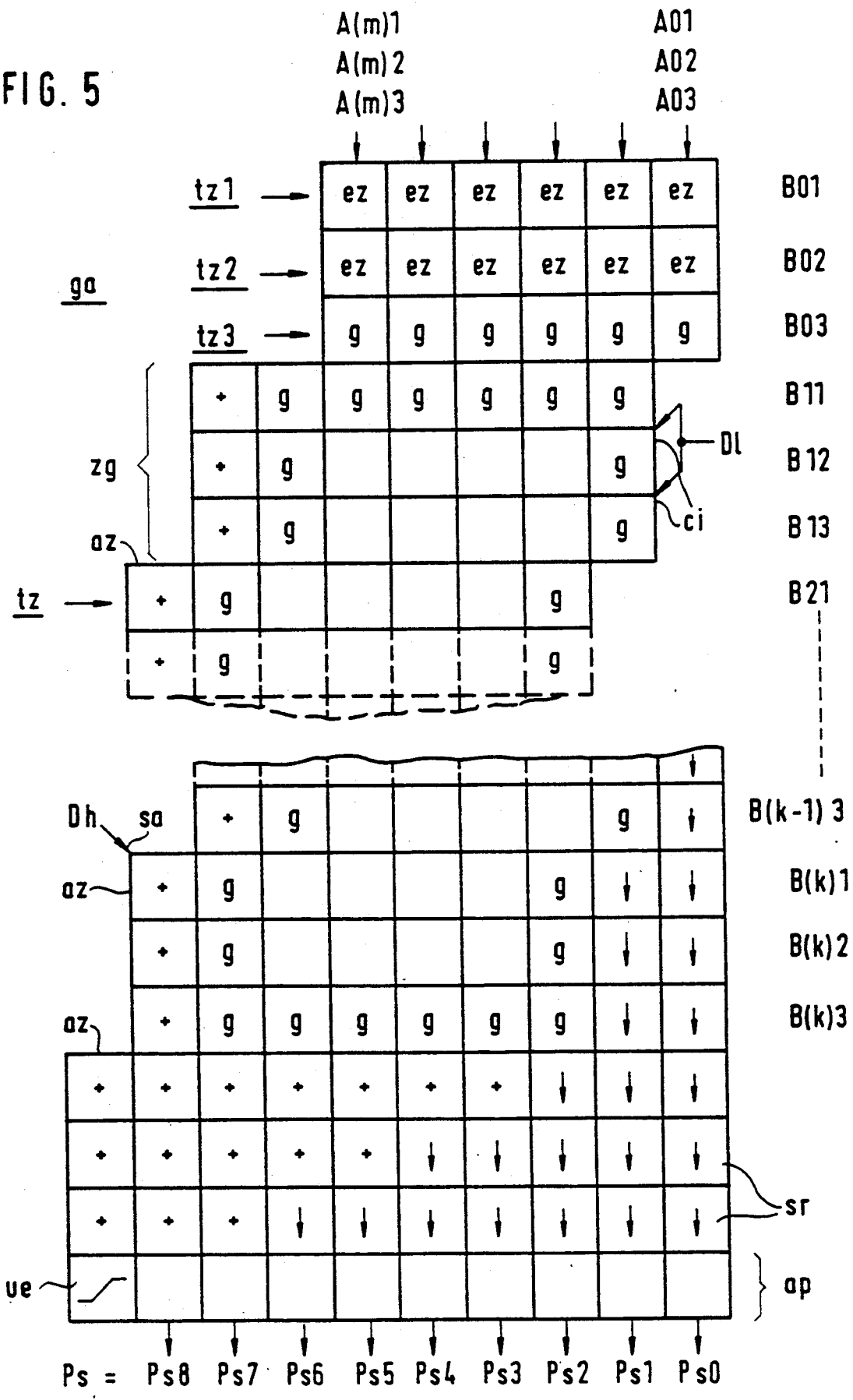
FIG. 5 shows schematically an overall array for calculating a triple product sum.

FIG. 5 shows an overall array for implementing the product summation in a block diagram. The overall array ga consists essentially of the basic cells g shown in FIG. 4. In the edge regions, this overall array ga has a few variations, namely, the input cells ez in the first two partial rows tz1, tz2, which each form a partial product from the applied, undelayed A- and B- coefficients and apply it directly to the sum input si and carry input ci, respectively, of that basic cell g in the third partial row tz3 which is located in the same column.

In the first partial row tz1, all partial products of the first A-binary number Am1 and the LSB coefficient B01 of the tz2, all partial products of the second A-binary number Am2 and the LSB coefficient B02 of the second B-binary number Bk2 are formed. Like the basic cells g, the input cells ez have through connections for n A-coefficients A1i, A2i, Ani, but they include no delay circuits dt.

At the left-hand edge of the overall array ga, there are only pure adding cells az, because these only have to process the overflow from the preceding partial row. The situation is similar in the lower area, where the partial-product formation is completed, while the overflow must still be passed through to the left.

The right-hand side of the overall array ga includes vertical shift-register cells sr which, in the low-order range, transfer the coefficients Ps0, Ps1, ... of the product sum Ps to the output buffer row ap. The most significant bits of this row are used for overflow recognition ue.

The low-order and higher-order D-coefficients Dl, Dh of the D-binary number can be added via free carry inputs ci at the right-hand edge and via free addend inputs sa at the left-hand edge, respectively. The double application of the low-order D-coefficient Dl shown in the embodiment of FIG. 5 causes this coefficient to be entered in the next higher-order position, so to speak.

The pipeline depth in the example shown, with three nine-digit A- and B- binary numbers, is seventeen full clock periods, i.e., in each row, seventeen time-graded partial-product sets are always on their way, with the product summation increasing in completeness from one partial row to another. In the output buffer row ap, the complete product-sum binary number Ps is finally available. In FIG. 5, only the nine most significant bits are covered, while the other, low-order bits are suppressed. One advantage of the structure shown is that overflow recognition and any limiting take place only at the end, so that subtotals may readily leave the permissible range of numbers.

The application of the above-described circuit arrangement for forming product sums is by no means limited to RGB matrix calculation. The circuit can be used to advantage wherever such product sums must be determined from n individual products, e.g., in the implementation of digital filter circuits.

The specific embodiments of the invention described herein are intended to be illustrative only, and many other variations and modifications may be made thereto in accordance with the principles of the invention. All such embodiments and variations and modifications thereof are considered to be within the scope of the invention, as defined in the following claims.

I claim:

1. Circuit arrangement for forming n products from two multidigit binary numbers Amn, Bkn and for adding said n products, where n is a positive integer greater than one, comprising:
   an overall array of n parallel multipliers, each comprising a basic array of individual partial product rows formed by respective basic cells;
   wherein the individual partial product rows of the n basic arrays are interleaved row by row so that the corresponding partial product rows of all n basic arrays are arranged one below the other in respective row groups of n partial product rows each, and wherein the successive partial product rows of all of the successive row groups are interconnected in a pipeline configuration in which each basic cell of a partial product row has an input end connected to adjacent basic cells of the partial product row located thereabove, including a sum input, a carry input, and n A-coefficient inputs, a B-coefficient input connected to a preceeding adjacent basic cell of the same partial product row, an output end connected to adjacent basic cells of the partial product row located therebelow, including a sum output, a carry output, and n A-coefficient outputs, and a B-coefficient output connected to a succeeding adjacent basic cell of the same partial product row, and wherein each basic cell contains: a delay unit for each of n A-coefficients which are applied to the A-coefficient inputs, said delay units being controlled by a half clock signal; an undelayed through connection for a B-coefficient which is applied to the B-coefficient input; an adder fed via respective delay units with the sum signal applied to the sum input, the carry signal applied to the carry input, and a summation input; and a logic gate which combines the B-coefficient with the undelayed A-coefficients to form the partial product thereof and provides said partial product to the summation input of said adder.

2. A circuit arrangement as claimed in claim wherein said logic gate is an AND gate.

3. A circuit arrangement as claimed in claim 1, wherein said logic gate is a NAND gate.

4. A circuit arrangement as claimed in claim 1, wherein n=3, the basic cells of the first two partial product rows are implemented as purely multiplying input cells, and in the first partial product row, all partial products of the first A-binary number (Am1) and the least significant bit (LSB) coefficient of the first B-binary number (Bk1) are formed without being delayed and applied to the carry inputs of the basic cells of the third partial row, and in the second partial product row, all partial products of the second A-binary number (Am2) and the LSB coefficient of the second B-binary number (Bk2) are formed without being delayed and applied to the sum inputs of the basic cells in the third partial product row, the through connections for the n A-coefficients in said multiplying input cells contain no delay units, and the product formation in the second partial product row takes place simultaneously with the product formation in the first partial product row.

5. A circuit arrangement as claimed in claim characterized in that D-coefficients are added as multidigit D-binary numbers to the product sum of the two A- and B-binary numbers via free carry inputs at one edge of the overall array and via free addend inputs at an opposite edge of the overall array, respectively.

6. A circuit arrangement as claimed in claim 5, wherein additional "ones" are added to the product sum, in accordance with a two's complement representation of the binary numbers Amn, Bkn, via said free addend and carry inputs at the opposite edges, respectively, of the overall array.

* * * * *